United States Patent
Detronde

(10) Patent No.: US 6,537,386 B1
(45) Date of Patent: Mar. 25, 2003

(54) APPARATUS AND METHOD FOR SURFACE TREATMENT OF METAL ARTICLES

(75) Inventor: Michel Detronde, Uckange (FR)

(73) Assignee: Heckett Multiserv PLC, London (GB)

(*) Notice: Subject to any disclaimer, the term of this patent is extended or adjusted under 35 U.S.C. 154(b) by 0 days.

(21) Appl. No.: 09/807,119

(22) PCT Filed: Oct. 14, 1999

(86) PCT No.: PCT/GB99/03419

§ 371 (c)(1),
(2), (4) Date: Apr. 23, 2001

(87) PCT Pub. No.: WO00/21708

PCT Pub. Date: Apr. 20, 2000

(30) Foreign Application Priority Data

Oct. 14, 1998 (GB) .............................. 9822429

(51) Int. Cl.⁷ .............................. B23K 5/00; B23K 7/06
(52) U.S. Cl. .......................................... 148/195; 266/51
(58) Field of Search ............................. 148/195; 266/51

(56) References Cited

U.S. PATENT DOCUMENTS

| | | |
|---|---|---|
| 4,219,844 A | 8/1980 | Ohsumi et al. |
| 4,318,439 A | 3/1982 | Hiroshima et al. |
| 4,601,762 A | 7/1986 | Pirlet |
| 4,615,377 A | 10/1986 | Whitaker |
| 4,671,674 A | 6/1987 | Detronde |
| 5,071,105 A | 12/1991 | Donze et al. |

FOREIGN PATENT DOCUMENTS

| | | | |
|---|---|---|---|
| BE | 895665 | 5/1983 | |
| EP | 0009753 | 9/1979 | |
| EP | 0145877 | 10/1984 | |
| EP | 0336807 | 3/1989 | |
| JP | 46-32850 | * 9/1971 | ................ 148/195 |
| JP | 59174275 | 10/1984 | |
| JP | 10118765 | 5/1998 | |
| JP | 08150471 | 7/1999 | |

* cited by examiner

Primary Examiner—Deborah Yee
(74) Attorney, Agent, or Firm—Caesar, Rivise, Bernstein, Cohen & Pokotilow, Ltd.

(57) ABSTRACT

A camera is arranged to map defects in the molten metal bath formed by scarfing using a scarfing torch on a steel slap. The camera has a field of a large area of the slab and records the defects as flashes of high intensity light the nature of which identifies the type of defect.

15 Claims, 8 Drawing Sheets

```
MOVE TORCH TO FOCUS CAMERA ON MOLTEN BATH
```
```
APPLY FLAME TO OVERHEAT MOLTEN BATH
```
```
OBSERVE AND RECORD IMAGES OF FLASHES OF LIGHT
```
```
MOVE TORCH TO SCARF WHERE FLASHES APPEAR ACCORDING TO NEED
```
```
RECORD DATA
```
```
ANALYSE DATA TO DETERMINE DEFECTS BY COMPARISON WITH
PREVIOUSLY RECORDED DATA
```
```
DRAW MAP TO RECORD THE DEFECTS BY LOCATION AND NATURE
```
```
SUPPLY INFORMATION TO CASTER
```

FIG. 5

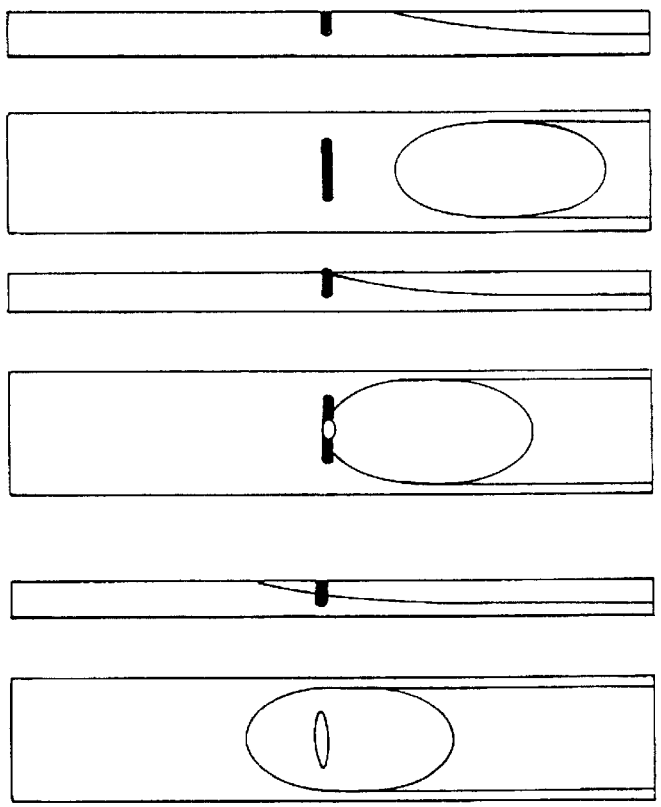
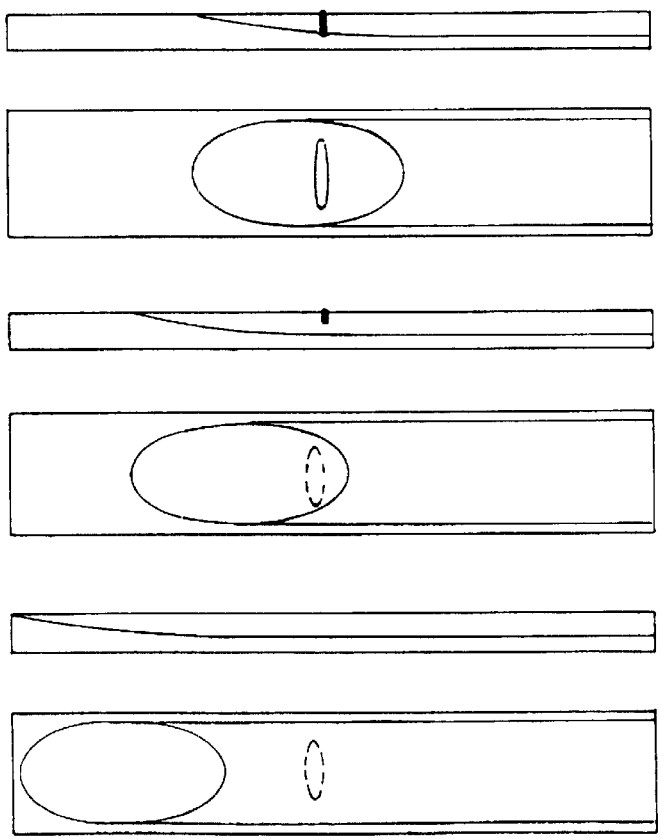
FIG. 7E

APPARATUS AND METHOD FOR SURFACE TREATMENT OF METAL ARTICLES

This invention relates to the surface treatment of metal articles and is particularly concerned to provide an improved means of identifying and repairing faults at or near the surface of metal.

The invention is particularly useful in the identification and removal of blemishes, cracks, tears and inclusions at or below the surface of articles of hot semi-finished continuous cast products. Typically such products are to be hot rolled into sheets or the like. Unfortunately the semi-finished products can have visible (or invisible) defects or weak points, in or immediately below the surface, e.g. fissures, tears, folds or the like. If these are carried into the rolled products rejects will arise and even damage of the surface of the roller cylinders can occur. It is thus usual to inspect the semi-finished product before proceeding with the rolling, to determine whether they can be rolled directly or whether they must be treated beforehand to move or repair the defects which they have, or even if they are of such low quality that they must be rejected and recycled.

Because the semi-finished products are hot, an observer cannot examine them directly. There have been a number of proposals based on the principle of forming an image of the defects from a distance which will then save as a guide for the repair of the surface usually by machine or hand operated scarfing.

In U.S. Pat. No. 5,071,105, for example, there is described a scarfing torch to remove blemishes from the surfaces of steel billets, ingots and the like in which the torch is fitted with a nozzle having a visual observation optical device extending co-axially inside a central gas feed pipe and situated a specific distance from the main orifice of the nozzle so that the bounds of its angle of view pass through the edges of the main orifice.

U.S. Pat. No. 4,615,877 describes a method of striping hot steel slabs in which an optical pyrometer 41 is mounted on a vertical bracket 38 and is directed toward a surface of a metal slab 12. The bracket 38 is mounted upon a reciprocating beam 32 to which a scarfing torch 36 is similarly mounted. To effect a maximum sensitivity and accuracy of the pyrometer 41, it is focused on the area near the leading edge of the molten puddle of metal created by the scarfing torch. The pyrometer is arranged to detect flashes, and testing has shown that accurate focusing of the pyrometer is critical to operation of the apparatus of pick up all flashes as they occur.

U.S. Pat. No. 4,671,674 discloses a process for the detection of weak points or defects on steel semi-finished products, in which a gantry has a blowtorch and a camera mounted thereto. The camera is able to view the image of the points of application of the torch flame. The document concerns a process where detection and repair are separate operations, undertaken by separate operatives. This method does not lead to a fast and reliable detection and repair process.

JP-A-59174275 describes a process in which a camera appears to be focused onto a point in the molten metal bath generated by the scarfing torch. The camera is not mounted on the torch and does not appear to have a field of vision greater than and encompassing the area of the molten metal bath.

JP-A-10118756 relates to a hot scarf control device in which pre and post scarfing CCD cameras are provided. The first determines the slab stop position and the second (or post-scarf) identifies the state of the slab immediately after scarfing. Neither of the cameras appear to be mounted on the torch.

BE-A-895665 (which is equivalent to U.S. Pat. No. 4,601,762) describes a method for conditioning metal products in which the detection and scarfing devices are separate entities. The monitoring device is similarly separate and no information is provided as to their particular orientation.

It is one object of the present invention to provide a method and an apparatus in which their particular orientation.

It is one object of the present invention to provide a method and an apparatus in which the field of vision surveyed by an optical device associated with a gas torch can be greatly enhanced and to provide a method of removing surface defects from the metal article by a continuous process of observation, identification and removal.

Accordingly, in one aspect the invention provides a method detecting and removing defects from metal articles by scarfing, the method comprising the steps of:

directing an optical viewing device which is mounted on a scarfing torch to view the hot surface of the metal article to be scarfed and to locate defects and identify them by area and depth;

adjusting the position of the torch according to sensed data to scarf away the defects;

recoding the defects and the scarfed area;

characterised by the optical viewing device is arranged to view an area greater than and including that area of the metal surface which is scarfed upon operation of said scarfing torch.

Preferably the scarfing torch supplies flame to overheat the surface of the metal to be scarfed so that the overheated metal produces flashes of high intensity light which are sensed by the optical device and are identified as defects to be scarfed. These are then photographed to record the defects. This step may be in the form of a first scarfing pass Preferably the size of the flash is used to determine the size of the defect. Also, the shape of the flash of light is used to identify the nature of the defect. Specific shapes and their meaning is set out below.

Most preferably the method includes the step of moving the torch along successive wide generally parallel passes.

Typically the defect detection and elimination is performed on long, flat, metallic products at an ambient or elevated temperature produced either by ingot casting or a continuous casting apparatus.

It is a feature of the invention that the method involves analysing the hot bath of molten metal using a camera following the scarfing operation to provide an image to be reviewed by an operator.

The image can be used to give a real time picture which can be analysed by an operator or by comparator means.

In practice, the metal article, typically a hot slab, is placed at a scarfing station and then scarfed. This creates a bath of molten metal as the surface metal is removed, and the optical viewing device tracks the scarfed surface and takes photographs of the high intensity flashes of light created by the effects which remain after the initial scarfing. A map of the surface of the slab has previously been created, and the photographs are compared to the map to establish where the defects remain. The flashes of the light recorded on the photographs identify the nature of the defects, so the operator can readily carry out a secondary scarfing for local treatment, i.e. removal of these By the method of the invention defects can be identified and removed in one continuous operation which can proceed at a speed compatible with that of a continuous casting operation and, because of the external mounting of the optical device adjacent the torch, a wide surface area can be seen at any one time. This enables the operator to locate defects over a wide area and treat them readily.

According to the invention in another aspect there is provided apparatus for the detection and elimination of defects on metal articles, the apparatus comprising a scarfing torch to melt a localised region of the surface of the metal to provide a bath of molten metal, an optical viewing device mounted externally on the scarfing torch and a computer controlled means to quantify and qualify the defects detected in the bath of molten metal, the defects being removable by action of said torch, characterised in that the optical viewing device is arranged to provide, in use, a field of vision greater than an embracing the bath of molten metal.

Preferably the apparatus includes means to analyse the image provided by the optical device in the form of flashes of light, and to classify these are defects according to size and depth of defect and optionally by nature (crack or inclusion) and number.

It is preferred that the apparatus includes means to provide instructions for positioning the torch, to create into a map of the locations of the defects.

It is much preferred that the torch has a generally circular front face having multiple flames enabling simple defect detection by a simple single movement of elimination by large passes and the torch includes means for instantaneous change from one operating processes to another.

Preferably the apparatus has means to process both television type and industrial type images at a speed of 25 or 30 images per second, in colour or black and white The optical device may be connected to a visual display unit remote from the hot metal article whereby an operator can observe the localised region of the surface and react to any visual defects shown by appropriate scarfing using the torch. The optical device may be a video camera or CCD camera (charge coupled device) to transmit images to a remote, operator-viewed screen or to a microprocessor-controlled automated system. The optical device may be in the form of an array of optical fibers connected to a remote control system. The optical device may be connected to computer-controlled means to interpret the signals received, identify defects and control movement of the scarfing torch to remove defects in direct response to the signals received. The apparatus may also include a video cassette recorder or the like for a permanent record.

The optical device may be mounted, for example, on a frame beneath which the metal article to be treated is passed. If desired, the optical device and the torch may be mounted to travel along their supporting frame so that they can be moved transversely across the metal surface passing beneath them. This option is particularly useful where semi-finished metal products are of considerable width, e.g. up to several metres. Alternatively, it may be necessary install a multiplicity of torches and optical devices on the frame spanning the metal surface.

Preferably the camera operated vision system causes a permanent picture of the bath while the blow torch is operated. The image is optimised to visualise the useful zone in the field of vision of the camera in order to detect defects (in the bath, both for defects with lower and greater depth than that of the bath pattern).

The parameterization of the camera shooting conditions is adapted to the types of defects which are expected to be found on the basis of the product development data analysis (shutter adapted to a micro-inclusions for example).

The photograph device is automatically adjusted to the bath image for both cold and hot slabs at a temperature up to 1000° C. and over.

The image processing system preferably sets the reference point in relation to the bath for defect detection.

records at any time the position of the point of reference in relation to the product to establish a map of the defect locations.

selects automatically the "interesting" zones for defect detection on the bath image (classified as: shallow, fairly deep, very deep and located at the rear of the bath). The depth is actually linked to the measurement of the bath pattern. In one preferred embodiment of the system, 4 distinct zones have been isolated and analyzed one by one.

detects the flashes of light by contrast on the basis of the average level of grey thresholds for the zone in question.

distinguishes flashes of light indicative of defects from flashes of light produced by dust particles coming into the camera's field of vision.

counts the number of defects in the zone in question.

measures the coordinates of each defect on the basis of two reference axes.

records the shape and the surface of the defects for comparison with those previously encountered and recorded.

compares the evolution of the flashes with a similar reference axis on all successive images where they appear in order to confirm the nature of defects.

The image processing system both images recorded from the detection operation images recorded from the defect elimination operation.

The system can process simultaneously images taken on the basis of different filming parameters to both detect and eliminate gross and tiny defects.

Embodiments of the invention are described by way of example only with reference to the accompanying diagrammatic drawings in which:

FIG. 5 is a flow chart of representation steps; and

FIGS. 7A to 7F are a series of sketches showing the method applied to different defects.

Figure 1:
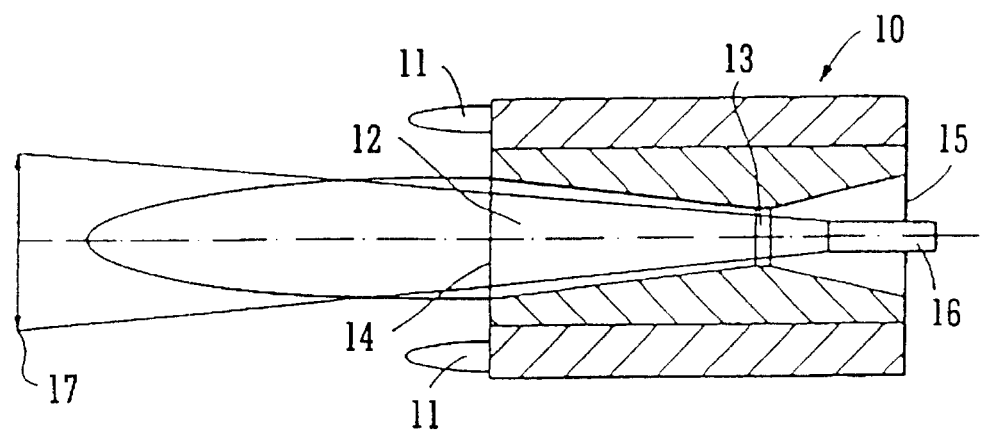
FIG. 1 is a diagrammatic representation in part section of a prior art apparatus for the surface inspection and treatment of hot semi-finished metal products.
Figure 2:
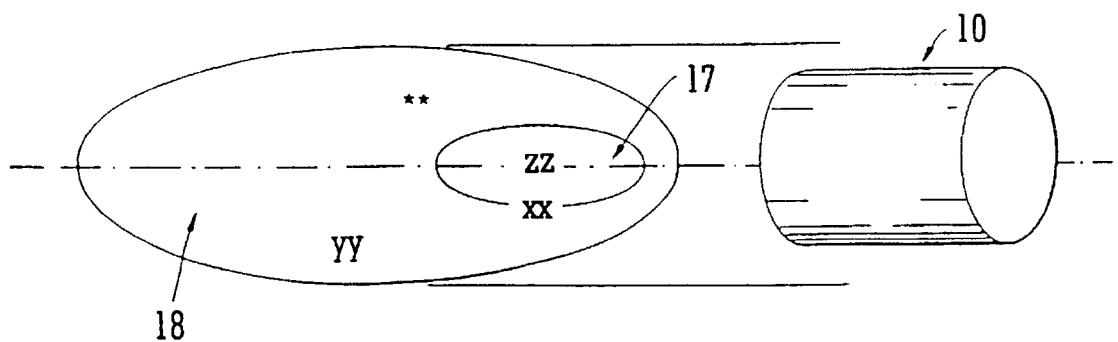
FIG. 2 is a representation in perspective view corresponding to FIG. 1.

In FIGS. 1 and 2 a scarfing torch 10 comprises an annular peripheral array of burner nozzles 11 surrounding a central orifice 12. Orifice 12 tapers from a narrow central position 13 to a wider central outlet 14 at the burner end of the torch and to a wicker inlet 15 at the opposite end. A camera 16 is mounted on inlet 15 to have a field of vision passing through narrow central portion 13 and outlet 14 to form an elliptical vision region 17 on the surface of the hot metal product to be viewed. The camera screen may have a pixel density of the order of 750×500 pixels, or similar.

As shown clearly in FIG. 2, region 17 represents only a small proportion of area 18 of the metal surface that is melted by the array of burner nozzles 11. Thus, as can be seen, a fault zz within region 17 can be detected and treated but faults such as **, yy and xx within region 18 lie outside region 17.

Figure 3:
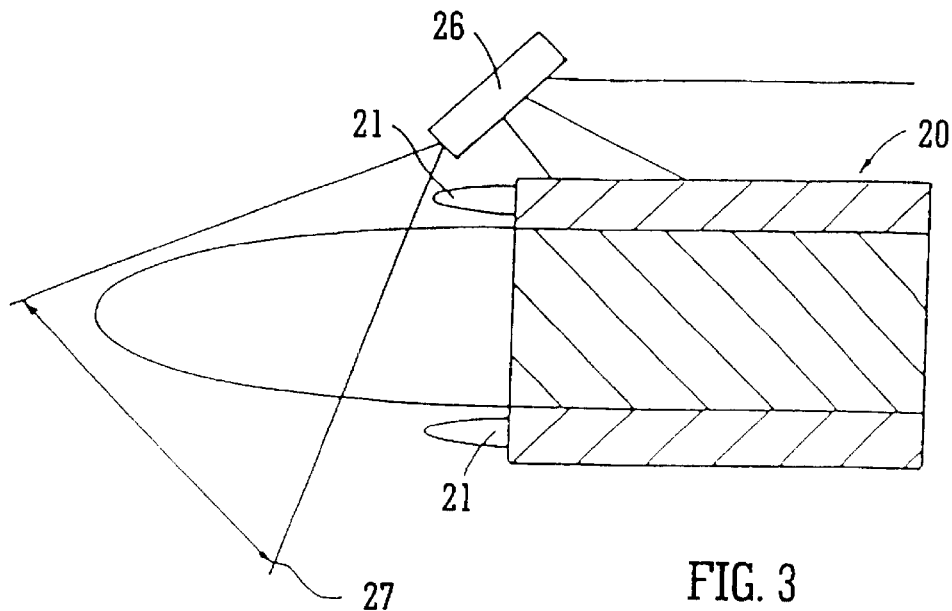
FIGS. 3 and 4 are views similar to FIGS. 1 and 2 respectively but of an apparatus according to the present invention.
Figure 4:
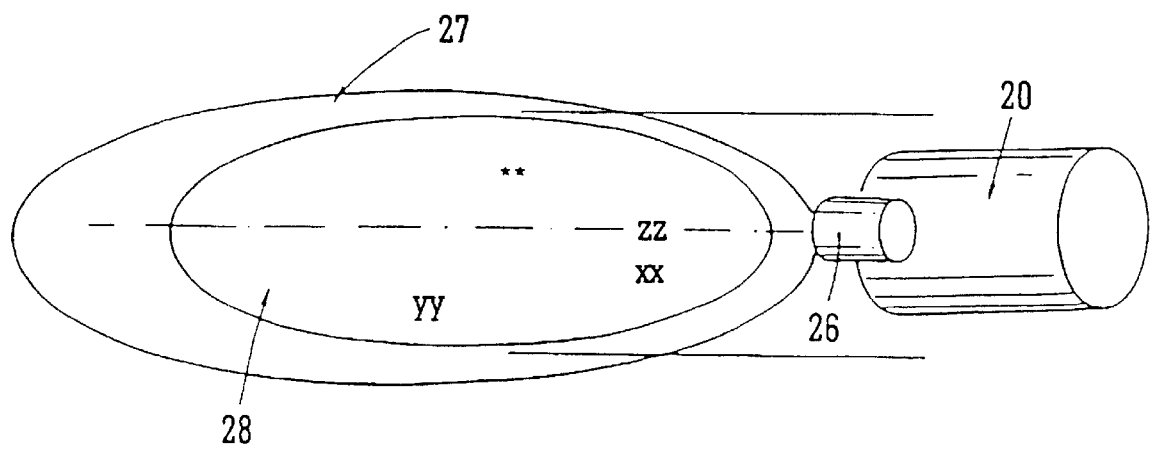

One device of the present invention, shown in FIGS. 3 and 4, is a torch 20 having an annular peripheral array of burner nozzles at its front wall and producing flames 21. A camera 26 is mounted externally of and spaced from torch 20 so as to have a field of vision 27 that is large than and includes the complete area 28 of the metal surface that is melted by the array of burner nozzles. Thus all faults **, xx, yy and zz now lie within the field of vision of the camera and can be treated appropriately by a scarfing operation.

The method can include one sequence of steps shown in FIG. 5. The method will typically include the steps but the sequence of the later ones may be changed.

Because the field of vision is wide, and faults of all types can easily be seen, the operator can react quickly to repair the detected faults. The torch of the invention can thus cope with relatively fast moving hot articles travelling from a continuous caster to a hot rolling mill without disrupting the flow.

The apparatus may include a computer and a monitor, and also a video cassette recorder so that a record can be kept of the faults detected and that they have been addressed. It is believed that this is the first time it has been possible to record such data in relation to moving hot articles at a steelworks.

Figure 6:
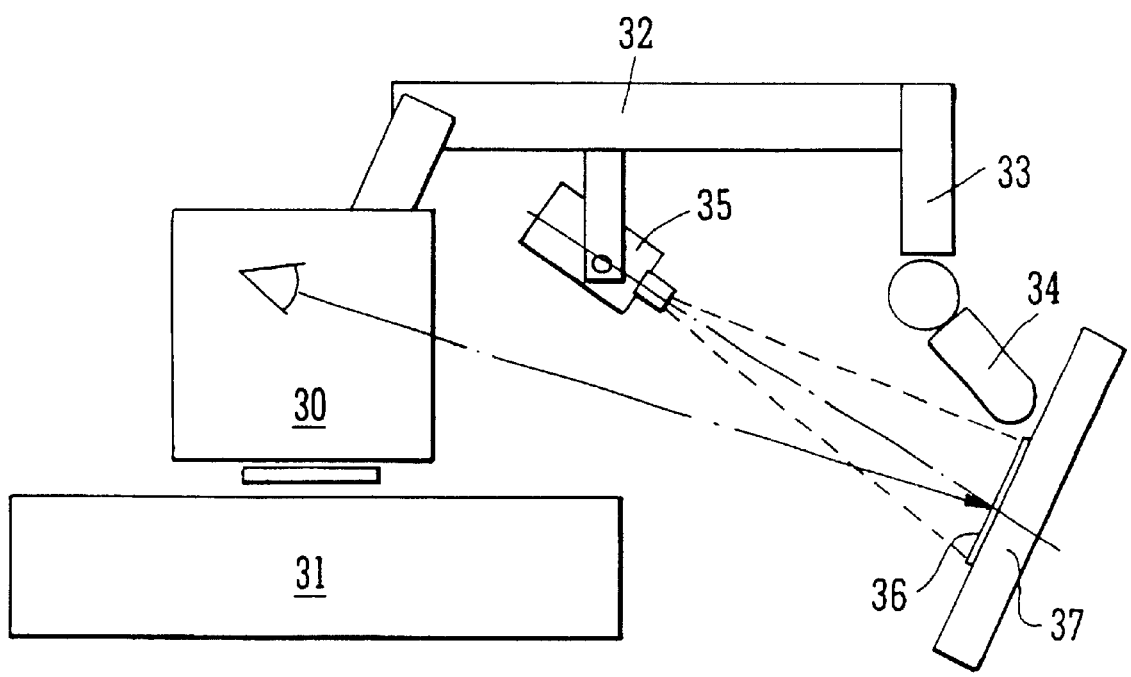
FIG. 6 is an elevation of one scarfing station.
Figure 7A:
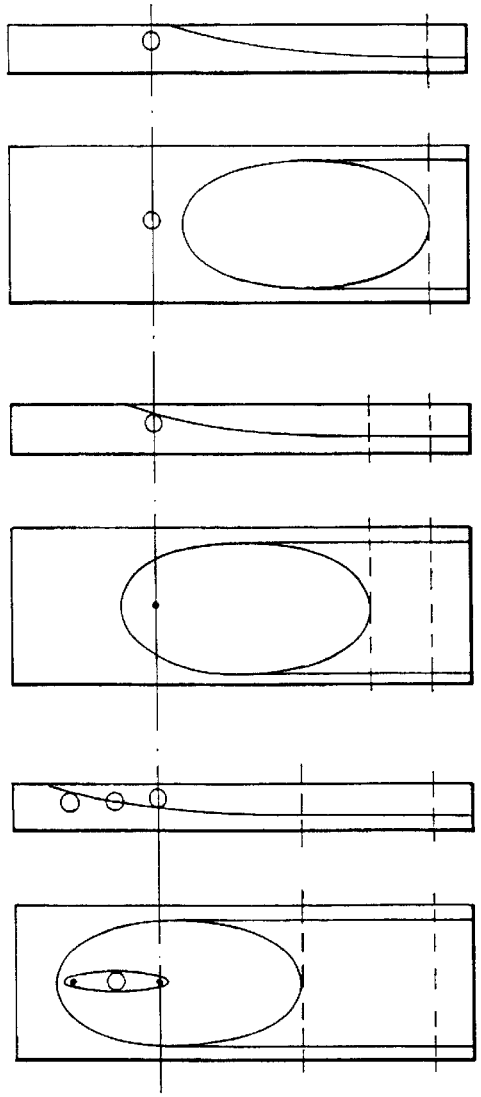
Figure 7B:
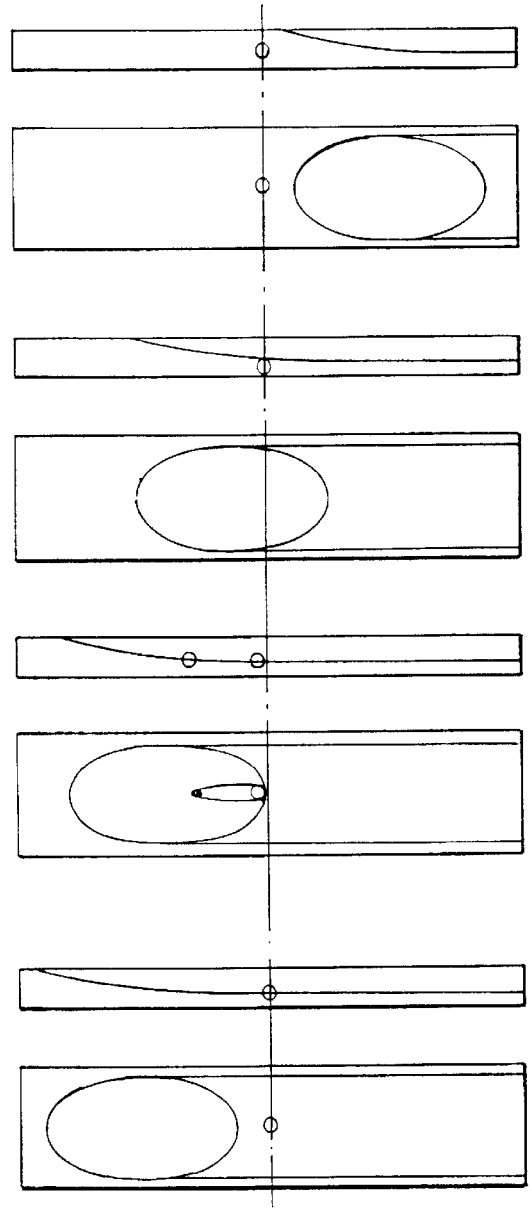
Figure 7C:
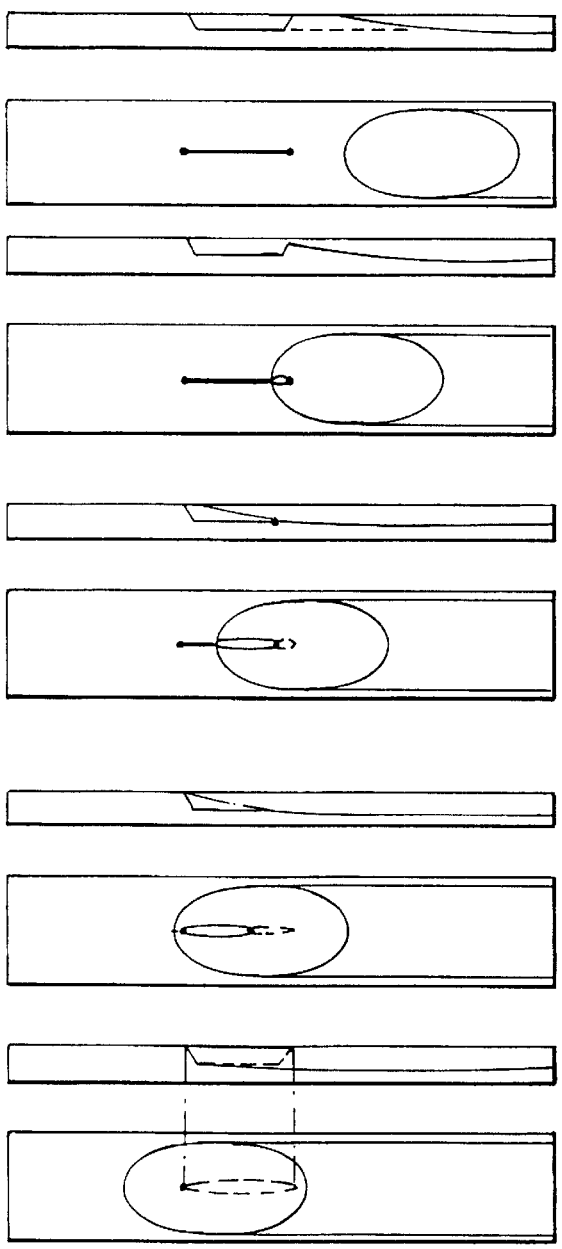
Figure 7D:
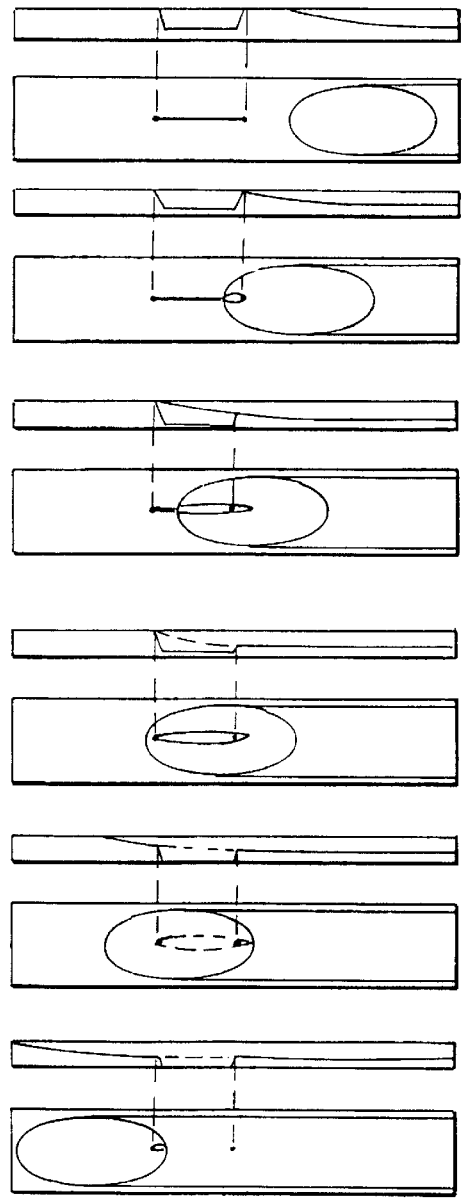
Figure 7F:
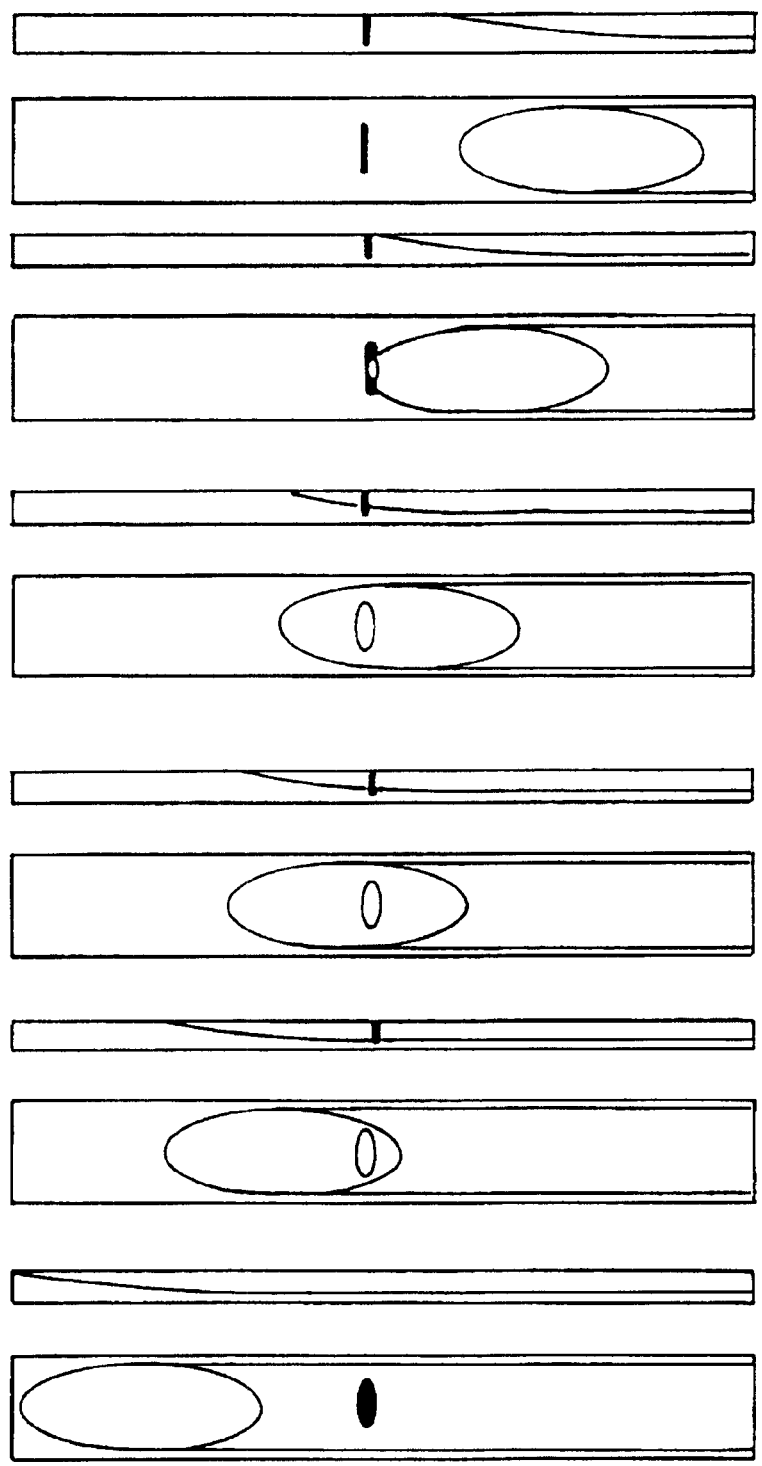

FIG. 6 shows an elevation of one workstation. The operator sits in a cabin 30 mounted on a support 31 and arranged so that it can rotate. An articulated arm 32 extends forward from the cabin 30 and has a depending foot 33 to the end of which is pivotally mounted a scarfing torch 34. A camera 35 is mounted below the arm 32 and is arranged to view a substantial area 36 of a slab 37 mounted at an angle on a support not shown. In use the slab 37 is moved under operator control passed the torch 34 which accordingly scarfs a length of slab; the position of the slab is moved for each pass so that substantially the total surface area is scarfed. The camera 35 is arranged to view the bath of molten metal created by the scarf and following the torch; it takes photographs at the rate of 25 to 35 images per second. A surface which is free of defects will appear generally grey, but a defect will cause a high intensity light which will be recorded on the photograph. A map of the surface of the slab 37 has been pre-recorded, and the operator, or more typically a computer comparator, will overlay the photographs with the map. This provides the operator with a record of remaining defects and their character. The operator can then carry out a second pass to remove these.

FIG. 7 shows a sketch for the time when the photograph is taken of the bath following the scarfing pass for different defects. FIG. 7A shows the events for the case where there is an inclusion more shallow than the bath; FIG. 7B is for the case where there is an inclusion deeper than the bath. FIGS. 7C and 7D are the same for an L-shaped crack and FIGS. 7E and 7F for a T-shaped crack.

The invention is not limited to the embodiment shown. The image may be in colour or black and white; successive images may be merged to provide one picture. The images may be interpreted using a neural network.

What is claimed is:

1. A method of detecting and removing defects from metal articles by scarfing, the method comprising:
    a) melting a localised region of a surface of the metal article with a scarfing torch;
    b) viewing, via an optical viewing device mounted externally on the torch, an area larger than the localised region;
    c) sending signals from the viewed area to computer means arranged to receive and interpret the signals to identify defects by area and depth; and
    d) moving the torch in direct response to the signals received to scarf away the defects.

2. A method according to claim 1, wherein the scarfing torch supplies flame to overheat the surface of the metal to be scarfed so that the overheated metal produces flashes of high intensity light which are tracked by the optical device and are identified as defects to be scarfed.

3. A method according to claim 2, wherein the size of the flash is used to determine the size of the defect.

4. A method according to claim 2, wherein the shape of the flash of light is used to identify the nature of the defect.

5. A method according to claim 3, further including the step of moving the torch along successive wide generally parallel passes.

6. A method according to claim 4, further including the step of moving the torch along successive wide generally parallel passes.

7. A method according to claim 1, wherein the metal to be scarfed is at about 1000° C. or higher.

8. A method according to claim 6, wherein defect detection and elimination is performed on long, flat, metallic products at an ambient or elevated temperature produced either by an ingot casting or a continuous casting apparatus.

9. Apparatus for the detection and removal of defects on metal articles, the apparatus comprising a scarfing torch arranged to melt a localized region of the surface of the metal to provide a bath of molten metal, an optical viewing device mounted externally on the scarfing torch and arranged to provide a field of vision greater than and including the bath of molten metal, and computer controlled means to receive signals from the field of vision and to interpret the signals to identify and characterize the defects and to move said scarfing torch in direct response to the signals received to scarf away the characterized defects.

10. Apparatus according to claim 9, further including means to analyze the image provided by the optical device in the form of flashes of light, and to classify these as defects according to size and depth of defect and optionally by nature (crack or inclusion) and number.

11. Apparatus according to claim 9, including means to provide instructions for positioning the torch and to create a map of the area to be scarfed.

12. Apparatus according to claim 9, wherein the torch has a generally circular front face having multiple flames enabling simple defect detection by a simple single movement or elimination by large passes and the torch includes means for instantaneous change from one operating processes to another.

13. Apparatus according to claim 9, including means to process video images at a speed of 25 to 30 images per second, in color or black and white.

14. Apparatus according to claim 9, including a monitor for simultaneous control by the operator, coupled to a video tape recorder to a document a data record of the defects detected.

15. A method according to claim 1, wherein the metal articles being scarfed are passing from a continuous caster to a hot rolling mill.

* * * * *